(No Model.)
C. L. NORTH.
RAISIN STEMMER.
No. 395,916. Patented Jan. 8, 1889.
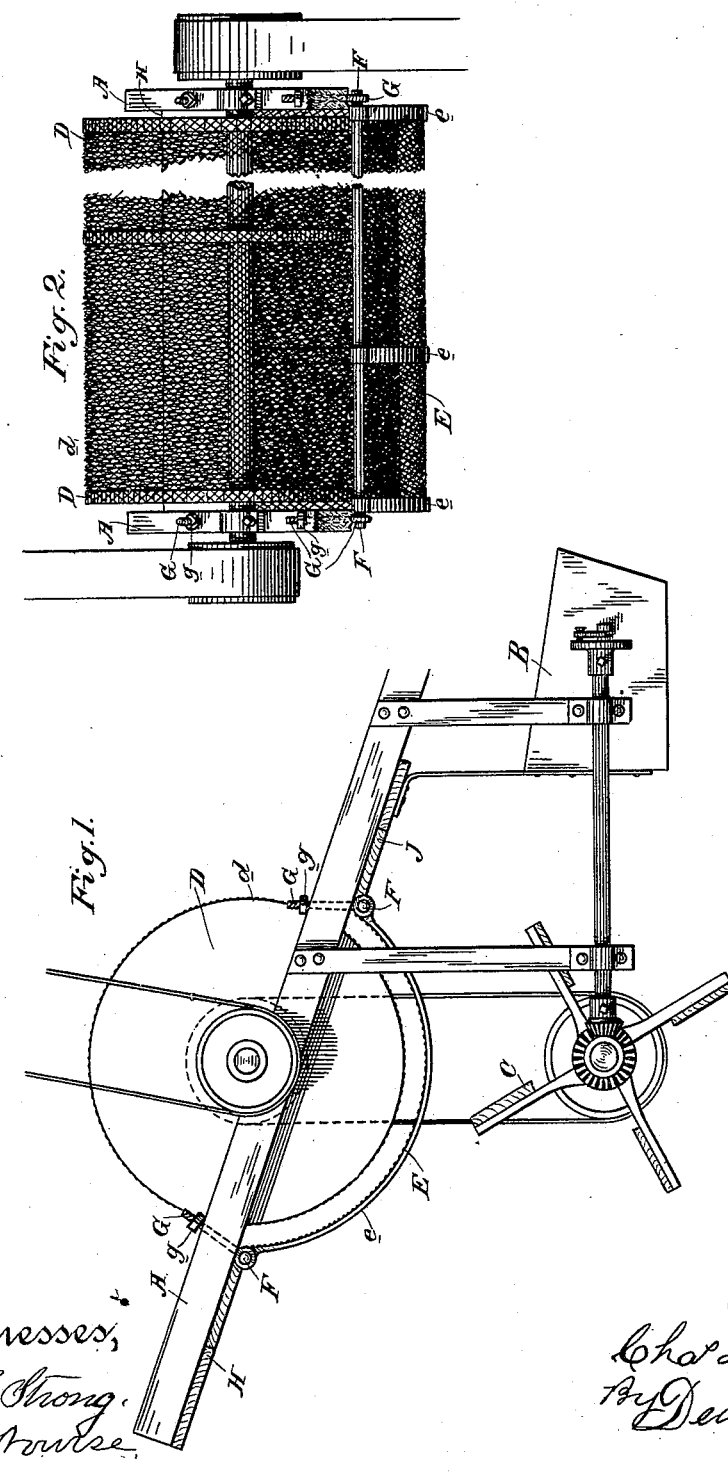
Witnesses,
Geo. H. Strong.
J. H. Rowse.
Inventor,
Chas. L. North
By Dewey & Co.
attys

UNITED STATES PATENT OFFICE.

CHARLES L. NORTH, OF FRESNO, CALIFORNIA.

RAISIN-STEMMER.

SPECIFICATION forming part of Letters Patent No. 395,916, dated January 8, 1889.

Application filed July 27, 1888. Serial No. 281,239. (No model.)

*To all whom it may concern:*

Be it known that I, CHARLES L. NORTH, of the city of Fresno, Fresno county, State of California, have invented an Improvement in Raisin-Stemmers; and I hereby declare the following to be a full, clear, and exact description of the same.

My invention relates to that class of machines for stemming raisins in which the fruit is passed between opposing spaced surfaces formed of wire-cloth, one or both of said surfaces being movable; and my invention consists in novel improvements in the construction and arrangement of the opposing spaced wire-cloth surfaces, as I shall hereinafter fully describe.

The object of my invention is to provide a simple and effective raisin-stemmer which can be readily and perfectly adjusted and which will have no tendency to clog or choke.

Referring to the accompanying drawings for a more complete explanation of my invention, Figure 1 is a side elevation. Fig. 2 is a front view of the cylinder and concave.

A is the frame of the machine, in the lower portion of which is mounted a vibrating shoe, B, and a fan, C, very similar to the parts of a thrashing-machine, but which need no detailed description, as they do not form part of my invention.

Mounted in the head of the frame is a horizontal cylinder, D, which consists of a central shaft carrying spaced disks, over which is fitted the wire cloth or screen $d$, which forms the periphery or working-surface of the cylinder. Under the cylinder is the concave E, the surface of which is made of wire-cloth, which is supported upon a frame-work consisting of curved springs $e$, the ends of which are looped around cross-rods F, said rods being supported from the frame-timbers of the machine by means of the eyebolts G, which pass up through the timbers and receive nuts $g$ on their upper ends. These springs, forming the frame of the concave, serve to give it a certain degree of flexibility, which in some cases may be found advantageous. The eyebolts G, passing up through the timbers, are set at such an angle that, if extended, they would converge and meet at a point over the center plane of the cylinder. These bolts, by tightening them up or letting them out, raise or lower the concave to adjust its position with regard to the cylinder, and by being set at a converging angle with relation to each other it will be seen that upon drawing up or letting down the concave they bend and keep its frame conformable to the curve of the cylinder at all points, thus keeping the space between the working-surfaces exactly the same under any adjustment.

H is the feed-board by which the raisins are directed into the entrance of the space between the cylinder and the concave. The cylinder may be driven by any suitable means, and power may be transmitted from it by the mechanism illustrated to drive the fan and the shoe.

J is a directing-board from the cylinder to the shoe. It will be seen that the concave under the cylinder extends only through a portion of the circumference of the cylinder, here shown as a little less than the semi-circumference, the object being to avoid entirely inclosing the cylinder, but to have the passage between the cylinder and the concave short and direct and opening at each side of the horizontal cylinder.

The operation of the machine is as follows: The raisins are fed down the board H and enter the top of the space at the side of the cylinder and between it and the concave. The stems are torn from the raisins by the revolution of the cylinder and the rough surfaces, due to the wire-cloth both of the cylinder and the concave. The raisins emerge from the lower end of the space at the opposite side of the cylinder and pass over the directing-board J into the shoe of the machine. In thus passing through the cylinder and the concave all the raisins are subjected to exactly the same amount of operation, and each raisin passes through between the operating-surfaces but once.

I am aware that in raisin-stemming machines it is not new to pass the raisins between wire-cloth surfaces, as this has been done between upright rotating cones and within inclined cylinders, and I do not therefore claim this, broadly; but it will be seen that in the machines now in use the surfaces are usually arranged so that one is entirely inclosed by the other, and some of the raisins therefore pass around within the machine several times, while others are discharged in a short time, and all the raisins are not subjected, therefore, to the same amount of operation. In these machines, also, there is a tendency to clog or choke up. In my machine the operating-passage through which the raisins are directed is short and direct and each raisid passes through but once, and all are subjecten to the same amount of working; nor is there any tendency to clog or choke. In my machine the raisins are fed to the side of the cylinder and are carried direct by its revolution to the opposite side, where they are discharged.

Having thus described my invention, what I claim as new, and desire to secure by Letters Patent, is—

1. In a raisin-stemmer, the horizontal rotary cylinder having its periphery or working-surface composed of wire-cloth, in combination with the concave under said cylinder and having its surface composed also of wire-cloth, the spring-strips $e$, supporting the wire-cloth, the rods on which the ends of the concave are supported, and the adjustable eye-bolts supporting the rods, whereby the concave may be adjusted with relation to the cylinder, substantially as herein described.

2. In a raisin-stemmer, the horizontal rotary cylinder having its periphery or working-surface composed of wire-cloth, in combination with an underlying concave having its surface composed also of wire-cloth and its frame made up of spring-strips, substantially as herein described.

3. In a raisin-stemmer, a horizontal rotary cylinder having its periphery or working-surface composed of wire-cloth, in combination with an underlying concave having its surface composed also of wire-cloth and its frame made of spring-strips, the rods supporting the spring-strips, and the adjustable eyebolts passing through the frame-timbers at an angle in converging planes, as described, whereby the concave may be adjusted up or down and its spring-frame bent to conform to the curvature of the cylinder in any position, substantially as herein described.

In witness whereof I have hereunto set my hand.

CHARLES L. NORTH.

Witnesses:
S. H. NOURSE,
H. C. LEE.